US010891350B2

(12) United States Patent
Chen

(10) Patent No.: US 10,891,350 B2
(45) Date of Patent: Jan. 12, 2021

(54) METHOD AND DEVICE FOR ESTABLISHING WEBPAGE QUALITY MODEL

(71) Applicant: GUANGZHOU SHENMA MOBILE INFORMATION TECHNOLOGY CO., LTD., Guangdong (CN)

(72) Inventor: Ziniu Chen, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 779 days.

(21) Appl. No.: 15/653,780

(22) Filed: Jul. 19, 2017

(65) Prior Publication Data

US 2017/0316109 A1 Nov. 2, 2017

Related U.S. Application Data

(63) Continuation of application No. PCT/CN2015/096036, filed on Nov. 30, 2015.

(30) Foreign Application Priority Data

Jan. 21, 2015 (CN) .......................... 2015 1 0030753

(51) Int. Cl.
*G06F 16/00* (2019.01)
*G06F 16/957* (2019.01)
(Continued)

(52) U.S. Cl.
CPC .......... *G06F 16/957* (2019.01); *G06F 16/954* (2019.01); *G06F 16/9535* (2019.01); *G06F 16/9574* (2019.01); *G06F 16/9577* (2019.01)

(58) Field of Classification Search
CPC .. G06F 16/954; G06F 16/957; G06F 16/9577; G06F 16/9535; G06F 16/9574
See application file for complete search history.

(56) References Cited

U.S. PATENT DOCUMENTS 7,260,774 B2 8/2007 Lambert et al.
7,483,894 B2 1/2009 Cao
(Continued)

FOREIGN PATENT DOCUMENTS

CN 101055587 A 10/2007
CN 101178728 A 5/2008
(Continued)

OTHER PUBLICATIONS

Maeve O'Brien and Mark T. Keane, "Modeling User Behavior Using a Search-Engine", IUI'07, Jan. 28-31, 2007, ACM, pp. 357-360. (Year: 2007).*

(Continued)

*Primary Examiner* — Cheryl Lewis
(74) *Attorney, Agent, or Firm* — Sheppard Mullin Richter & Hampton LLP

(57) ABSTRACT

A web page quality model establishment method and apparatus are disclosed. The method includes: excavating, from a search engine log, a selected user behavior indicator of each web page included in the search engine log, and calculating, according to the excavated selected user behavior indicator of each web page, web page quality of a corresponding web page; extracting, from the search engine log, a selected quality feature of each web page included in the search engine log; and establishing a web page quality model according to the web page quality and the selected quality feature of each web page included in the search engine log. Accuracy of a web page quality model established by means of this solution is relatively high, and accuracy of calculated web page quality is relatively high, thereby ensuring accuracy of a web page sorting result and user experience.

18 Claims, 1 Drawing Sheet

(51) Int. Cl.

*G06F 16/954* (2019.01)
*G06F 16/9535* (2019.01)

(56) References Cited

U.S. PATENT DOCUMENTS

| | | | |
|---|---|---|---|
| 7,996,393 B1 | 8/2011 | Nanno et al. | |
| 8,402,031 B2 | 3/2013 | Govani et al. | |
| 8,589,399 B1 | 11/2013 | Lee et al. | |
| 8,615,514 B1 | 12/2013 | Fernandes et al. | |
| 8,639,682 B2 | 1/2014 | Cumby et al. | |
| 8,843,477 B1 | 9/2014 | Tirumalareddy et al. | |
| 8,938,463 B1 | 1/2015 | Kim et al. | |
| 9,047,278 B1 | 6/2015 | Mann et al. | |
| 9,116,994 B2 | 8/2015 | Park et al. | |
| 9,275,132 B2 | 3/2016 | Roberts et al. | |
| 2004/0006621 A1 | 1/2004 | Bellinson et al. | |
| 2007/0038608 A1 | 2/2007 | Chen | |
| 2008/0114624 A1 | 5/2008 | James | |
| 2009/0216760 A1 | 8/2009 | Bennett | |
| 2010/0145934 A1 | 6/2010 | Tran et al. | |
| 2010/0293179 A1 | 11/2010 | Chaudhuri et al. | |
| 2013/0151538 A1 | 6/2013 | Dmitriev et al. | |
| 2013/0173639 A1 | 7/2013 | Chandra et al. | |
| 2013/0268517 A1 | 10/2013 | Madhavan et al. | |
| 2014/0025701 A1 | 1/2014 | Zhu et al. | |
| 2016/0098488 A1* | 4/2016 | Battle | H04L 67/02 707/706 |

FOREIGN PATENT DOCUMENTS

| | | | |
|---|---|---|---|
| CN | 102486774 A | 6/2012 | |
| CN | 102654875 A | 9/2012 | |
| CN | 103544169 A | 1/2014 | |
| CN | 103544257 A | 1/2014 | |
| CN | 104615680 A | 5/2015 | |
| RU | 2336561 C2 | 10/2008 | |

OTHER PUBLICATIONS

Eugene Agichtein and Zijian Zheng, “Identifying “Best Bet” Web Search Results by Mining Past User Behavior”, Industrial and Government Applications Track Poster, KDD’06, Aug. 20-23, 2006, ACM, pp. 902-908. (Year: 2006).*

International Search Report and Written Opinion for Application No. PCT/CN2015/096036, dated Feb. 29, 2016, 10 pages.

Official Action dated Jul. 19, 2018, issued in related Russian Application No. 2017129409 (10 pages).

Search Report dated Jul. 16, 2018, issued in related Russian Application No. 2017129409 (2 pages).

First Search dated Mar. 21, 2016, issued in related Chinese Application No. 201510030753 (1 page).

First Office Action dated Mar. 29, 2016, issued in related Chinese Application No. 20151003075.3 (14 pages).

Supplementary Search dated Aug. 24, 2016, issued in related Chinese Application No. 20151003075.3 (1 page).

Notification to Grant Patent Right dated Sep. 26, 2016, issued in related Chinese Application No. 20151003075.3 (3 pages).

International Preliminary Report on Patentability dated Aug. 3, 2017, issued in related International Application No. PCT/CN2015/096036 (13 pages).

First Examination Report dated Jun. 19, 2020, issued in related Indian Application No. 201747024945, with English translation (6 pages).

* cited by examiner

METHOD AND DEVICE FOR ESTABLISHING WEBPAGE QUALITY MODEL

CROSS-REFERENCE TO RELATED APPLICATIONS

This application is a continuation application of International Application Serial No. PCT/CN2015/096036, filed Nov. 30, 2015, which claims the priority and benefit of Chinese application CN201510030753.1, filed on Jan. 21, 2015. The entirety of all of the aforementioned applications is incorporated herein by reference.

TECHNICAL FIELD

The present invention relates to the field of network technologies, and in particular, to a web page quality model establishment method and apparatus.

RELATED ART

With rapid development of network technologies, more users obtain information by using a web page. A user may enter a keyword (query) in a search engine. The search engine sends, to a server, the keyword entered by the user. The server searches for a web page corresponding to the keyword, then sorts found web pages, and feeds back the sorted web pages to the search engine for the user to select from. To improve user experience, the server sorts the found web pages according to relevance and web page quality as much as possible. As can be seen, the web page quality is an important factor affecting web page sorting. Currently, the web page quality is generally obtained according to a web page quality model. Accuracy of the web page quality model directly affects a web page sorting result and the user experience.

An existing web page quality model establishment method is that multiple manual rules are manually summarized from limited samples. For example, features affecting the web page quality are summarized by observing hundreds and thousands of web pages. Each feature may be used as a manual rule. Then, these manual rules are combined to obtain a web page quality model. In the method, a quantity of observed samples is limited, and accuracy of the established web page quality model is relatively poor. Consequently, accuracy of calculated web page quality is relatively poor, thereby affecting the web page sorting result and the user experience.

SUMMARY

Embodiments of the present invention provide a web page quality model establishment method and apparatus, to resolve a problem of relatively poor accuracy of an established web page quality model in the prior art.

According to an embodiment of the present invention, a web page quality model establishment method is provided, including:

excavating, from a search engine log, a selected user behavior indicator of each web page included in the search engine log, and calculating, according to the excavated selected user behavior indicator of each web page, web page quality of a corresponding web page;

extracting, from the search engine log, a selected quality feature of each web page included in the search engine log; and establishing a web page quality model according to the web page quality and the selected quality feature of each web page included in the search engine log.

Preferably, the selected user behavior indicator includes at least one of a total click rate, a long click rate, a final click rate, or a navigation click rate, or a combination thereof, where the total click rate is a quantity of times a web page is clicked, the long click rate is a quantity of times a dwell time on a web page exceeds first specified duration after the web page is clicked, the final click rate is a quantity of times a web page is the last web page clicked in search results, and the navigation click rate is a quantity of times a web page is the only web page clicked in search results.

Preferably, the calculating, according to the excavated selected user behavior indicator of each web page, the web page quality of a corresponding web page specifically includes:

calculating, for each web page, a user behavior ratio of a current web page according to a total click rate, a long click rate, a final click rate, and a navigation click rate of the current web page; and determining, for each web page, the web page quality corresponding to the user behavior ratio of the current web page according to a correspondence between a range of the user behavior ratio and the web page quality.

Preferably, the calculating a user behavior ratio of a current web page according to a total click rate, a long click rate, a final click rate, and a navigation click rate of the current web page specifically includes:

calculating a sum of the final click rate, the navigation click rate, and the long click rate of the current web page, to obtain a first sum value;

calculating a sum of the total click rate of the current web page and a first experience value, to obtain a second sum value; and calculating a ratio of the first sum value to the second sum value, and determining the ratio as the user behavior ratio of the current web page.

Optionally, the method further includes:

before the step of establishing a web page quality model according to the web page quality and the selected quality feature of each web page included in the search engine log, first filtering, according to the web page quality and the selected user behavior indicator, web pages included in the search engine log, and then establishing the web page quality model according to the web page quality and the selected quality features of the web pages that are obtained after filtering and that are included in the search engine log.

Preferably, the filtering, according to the web page quality and the selected user behavior indicator, web pages included in the search engine log specifically includes:

obtaining a total click rate of each web page included in the search engine log;

deleting a web page whose total click rate is less than or equal to a first specified quantity of times;

for web pages whose total click rates are greater than the first specified quantity of times and are less than or equal to a second specified quantity of times, reserving a web page having lowest web page quality, and deleting web pages except the reserved web page; and for web pages whose total click rates are greater than the second specified quantity of times, reserving a web page having highest web page quality, and deleting web pages except the reserved web page.

Preferably, the selected quality feature includes at least one of a user behavior dimension feature, a web page dimension feature, or a third-party evaluation feature, or a combination thereof.

Optionally, the method further includes:

substituting a selected quality feature of a selected web page in a web page whole set into the web page quality model, to obtain the web page quality of the selected web page;

calculating a text score of the selected web page;

calculating a composite score of the selected web page according to the web page quality and the text score of the selected web page; and correcting an existing web page sorting model according to the composite score and the web page quality of the selected web page, to obtain a new web page sorting model.

Preferably, the calculating a text score of the selected web page specifically includes:

obtaining a search request corresponding to the selected web page;

calculating a matching degree between text content of the selected web page and the search request corresponding to the selected web page; and determining the matching degree as the text score of the selected web page.

Preferably, the calculating a composite score of the selected web page according to the web page quality and the text score of the selected web page specifically includes:

normalizing the web page quality of the selected web page;

calculating an escape penalty score of the selected web page according to the text score of the selected web page; and multiplying the escape penalty score of the selected page by the text score of the selected web page, adding a product to a specified floating point number, and multiplying an obtained sum value by the normalized web page quality of the selected web page, to obtain the composite score of the selected web page.

Preferably, the calculating an escape penalty score of the selected web page according to the text score of the selected web page specifically includes:

determining whether the text score of the selected web page is greater than a first specified value; and if the text score of the selected web page is greater than or equal to the first specified value, determining that the escape penalty score of the selected web page is equal to a second specified value; or if the text score of the selected web page is less than the first specified value, determining that the escape penalty score of the selected web page is equal to a ratio of the text score of the selected web page to the first specified value.

Preferably, a method for normalizing the web page quality of the selected web page includes: the normalized web page quality of the selected web page=(the web page quality of the selected web page—the web page quality corresponding to a web page having lowest web page quality in the web page whole set)/(the web page quality corresponding to a web page having highest web page quality in the web page whole set—the web page quality corresponding to the web page having the lowest web page quality in the web page whole set).

According to an embodiment of the present invention, a web page quality evaluation method is further provided, including:

substituting a selected quality feature of a selected web page in a web page whole set into the web page quality model established according to the foregoing method, to obtain the web page quality of the selected web page;

calculating a text score of the selected web page;

calculating a composite score of the selected web page according to the web page quality and the text score of the selected web page; and evaluating the web page quality according to a value of the composite score of the selected web page.

Preferably, the calculating a text score of the selected web page includes:

obtaining a search request corresponding to the selected web page;

calculating a matching degree between text content of the selected web page and the search request corresponding to the selected web page; and determining the matching degree as the text score of the selected web page.

Preferably, the calculating a composite score of the selected web page according to the web page quality and the text score of the selected web page includes:

normalizing the web page quality of the selected web page;

calculating an escape penalty score of the selected web page according to the text score of the selected web page; and multiplying the escape penalty score of the selected page by the text score of the selected web page, adding a product to a specified floating point number, and multiplying an obtained sum value by the normalized web page quality of the selected web page, to obtain the composite score of the selected web page.

Preferably, the calculating an escape penalty score of the selected web page according to the text score of the selected web page includes:

determining whether the text score of the selected web page is greater than a first specified value; and if the text score of the selected web page is greater than or equal to the first specified value, determining that the escape penalty score of the selected web page is equal to a second specified value; or if the text score of the selected web page is less than the first specified value, determining that the escape penalty score of the selected web page is equal to a ratio of the text score of the selected web page to the first specified value.

Preferably, a method for normalizing the web page quality of the selected web page includes: the normalized web page quality of the selected web page=(the web page quality of the selected web page—the web page quality corresponding to a web page having lowest web page quality in the web page whole set)/(the web page quality corresponding to a web page having highest web page quality in the web page whole set—the web page quality corresponding to the web page having the lowest web page quality in the web page whole set).

Preferably, the selected quality feature includes at least one of a user behavior dimension feature, a web page dimension feature, or a third-party evaluation feature, or a combination thereof.

Preferably, the method further includes: correcting an existing web page sorting model according to the composite score and the web page quality of the selected web page, to obtain a new web page sorting model for sorting search results.

According to an embodiment of the present invention, a web page quality model establishment apparatus is further provided, including:

a web page quality calculation unit, configured to: excavate, from a search engine log, a selected user behavior indicator of each web page included in the search engine log, and calculate, according to the excavated selected user behavior indicator of each web page, web page quality of a corresponding web page;

a selected quality feature extraction unit, configured to extract, from the search engine log, a selected quality feature of each web page included in the search engine log; and a web page quality model establishment unit, configured to establish a web page quality model according to the web page quality and the selected quality feature of each web page included in the search engine log.

Preferably, the selected user behavior indicator includes at least one of a total click rate, a long click rate, a final click rate, or a navigation click rate, or a combination thereof, where the total click rate is a quantity of times a web page is clicked, the long click rate is a quantity of times a dwell time on a web page exceeds first specified duration after the web page is clicked, the final click rate is a quantity of times a web page is the last web page clicked in search results, and the navigation click rate is a quantity of times a web page is the only web page clicked in search results.

Preferably, the web page quality calculation unit specifically includes a user behavior ratio calculation subunit and a web page quality determining subunit, where the user behavior ratio calculation subunit is configured to: for each web page, perform the following operation: calculating a user behavior ratio of a current web page according to a total click rate, a long click rate, a final click rate, and a navigation click rate of the current web page; and the web page quality determining subunit is configured to determine the web page quality corresponding to the user behavior ratio of the current web page according to a correspondence between a range of the user behavior ratio and the web page quality.

Preferably, the user behavior ratio calculation subunit specifically includes: a first sum value calculation subunit, a second sum value calculation subunit, and a user behavior ratio determining subunit, where the first sum value calculation subunit is configured to calculate a sum of the final click rate, the navigation click rate, and the long click rate of the current web page, to obtain a first sum value;

the second sum value calculation subunit is configured to calculate a sum of the total click rate of the current web page and a first experience value, to obtain a second sum value; and the user behavior ratio determining subunit is configured to: calculate a ratio of the first sum value to the second sum value, and determine the ratio as the user behavior ratio of the current web page.

Optionally, the apparatus further includes a web page filtering unit, configured to:

filter, according to the web page quality and the selected user behavior indicator, web pages included in the search engine log, where in this case, the web page quality model establishment unit is configured to establish the web page quality model according to the web page quality and the selected quality features of the web pages that are obtained after filtering and that are included in the search engine log.

Preferably, the web page filtering unit specifically includes a total click rate obtaining subunit and a web page filtering subunit, where the total click rate obtaining subunit is configured to obtain a total click rate of each web page included in the search engine log; and the web page filtering subunit is configured to: delete a web page whose total click rate is less than or equal to a first specified quantity of times; for web pages whose total click rates are greater than the first specified quantity of times and are less than or equal to a second specified quantity of times, reserve a web page having lowest web page quality, and delete web pages except the reserved web page; and for web pages whose total click rates are greater than the second specified quantity of times, reserve a web page having highest web page quality, and delete web pages except the reserved web page.

Preferably, the selected quality feature includes at least one of a user behavior dimension feature, a web page dimension feature, or a third-party evaluation feature, or a combination thereof Optionally, the apparatus further includes: a selected quality feature substitution unit, a text score calculation unit, a composite score calculation unit, and a web page sorting model correction unit, where the selected quality feature substitution unit is configured to substitute a selected quality feature of a selected web page in a web page whole set into the web page quality model, to obtain the web page quality of the selected web page;

the text score calculation unit is configured to calculate a text score of the selected web page;

the composite score calculation unit is configured to calculate a composite score of the selected web page according to the web page quality and the text score of the selected web page; and the web page sorting model correction unit is configured to correct an existing web page sorting model according to the composite score and the web page quality of the selected web page, to obtain a new web page sorting model.

Preferably, the text score calculation unit specifically includes: a search request obtaining subunit, a matching degree calculation subunit, and a text score determining subunit, where the search request obtaining subunit is configured to obtain a search request corresponding to the selected web page;

the matching degree calculation subunit is configured to calculate a matching degree between text content of the selected web page and the search request corresponding to the selected web page; and the text score determining subunit is configured to determine the matching degree as the text score of the selected web page.

Preferably, the composite score calculation unit specifically includes: a normalization subunit, an escape penalty score calculation subunit, and a composite score calculation subunit, where the normalization subunit is configured to normalize the web page quality of the selected web page;

the escape penalty score calculation subunit is configured to calculate an escape penalty score of the selected web page according to the text score of the selected web page;

and the composite score calculation subunit is configured to: multiply the escape penalty score of the selected page by the text score of the selected web page, add a product to a specified floating point number, and multiply an obtained sum value by the normalized web page quality of the selected web page, to obtain the composite score of the selected web page.

Preferably, the escape penalty score calculation subunit specifically includes a text score judging subunit and an escape penalty score determining subunit, where the text score judging subunit is configured to determine whether the text score of the selected web page is greater than a first specified value;

the escape penalty score determining subunit is configured to: if the text score of the selected web page is greater than or equal to the first specified value, determine that the escape penalty score of the selected web page is equal to a second specified value; or if the text score of the selected web page is less than the first specified value, determine that the escape penalty score of the selected web page is equal to a ratio of the text score of the selected web page to the first specified value.

According to an embodiment of the present invention, a web page quality evaluation apparatus is further provided, including: the foregoing web page quality model establishment apparatus, a selected quality feature substitution unit, a text score calculation unit, a composite score calculation unit, and an evaluation unit, where the selected quality feature substitution unit is configured to substitute a selected quality feature of a selected web page in a web page whole set into the web page quality model, to obtain the web page quality of the selected web page;

the text score calculation unit is configured to calculate a text score of the selected web page;

the composite score calculation unit is configured to calculate a composite score of the selected web page according to the web page quality and the text score of the selected web page; and the evaluation unit is configured to evaluate the web page quality according to a value of the composite score of the selected web page.

Preferably, the text score calculation unit specifically includes: a search request obtaining subunit, a matching degree calculation subunit, and a text score determining subunit, where the search request obtaining subunit is configured to obtain a search request corresponding to the selected web page;

the matching degree calculation subunit is configured to calculate a matching degree between text content of the selected web page and the search request corresponding to the selected web page; and the text score determining subunit is configured to determine the matching degree as the text score of the selected web page.

Preferably, the composite score calculation unit specifically includes: a normalization subunit, an escape penalty score calculation subunit, and a composite score calculation subunit, where the normalization subunit is configured to normalize the web page quality of the selected web page;

the escape penalty score calculation subunit is configured to calculate an escape penalty score of the selected web page according to the text score of the selected web page;

and the composite score calculation subunit is configured to: multiply the escape penalty score of the selected page by the text score of the selected web page, add a product to a specified floating point number, and multiply an obtained sum value by the normalized web page quality of the selected web page, to obtain the composite score of the selected web page.

Preferably, the escape penalty score calculation subunit specifically includes a text score judging subunit and an escape penalty score determining subunit, where the text score judging subunit is configured to determine whether the text score of the selected web page is greater than a first specified value; and the escape penalty score determining subunit is configured to: if the text score of the selected web page is greater than or equal to the first specified value, determine that the escape penalty score of the selected web page is equal to a second specified value; or if the text score of the selected web page is less than the first specified value, determine that the escape penalty score of the selected web page is equal to a ratio of the text score of the selected web page to the first specified value.

Preferably, the selected quality feature includes at least one of a user behavior dimension feature, a web page dimension feature, or a third-party evaluation feature, or a combination thereof Preferably, the apparatus further includes: a web page sorting model correction unit, configured to correct an existing web page sorting model according to the composite score and the web page quality of the selected web page, to obtain a new web page sorting model.

The embodiments of the present invention provide a web page quality model establishment method and apparatus, and further provide a web page quality evaluation method and apparatus. A selected user behavior indicator of each web page included in a search engine log is excavated from the search engine log, and the web page quality of a corresponding web page is calculated according to the excavated selected user behavior indicator of each web page. A selected quality feature of each web page included in the search engine log is extracted from the search engine log. A web page quality model is established according to the web page quality and the selected quality feature of each web page included in the search engine log. In this solution, a web page quality model is automatically established based on a large amount of search engine logs. Compared with a manual summarizing manner in the prior art, accuracy of the established web page quality model is relatively high, and accuracy of calculated web page quality is relatively high, thereby ensuring accuracy of a web page sorting result and user experience.

BRIEF DESCRIPTION OF THE DRAWINGS

The disclosure will become more fully understood from the detailed description given herein below for illustration only, and thus are not limitative of the disclosure, and where.

To describe the embodiments of the present invention or the technical solutions in the prior art more clearly, the accompanying drawings needed for describing the embodiments or the prior art are briefly described below. Apparently, a person of ordinary skill in the art may still derive other accompanying drawings from these accompanying drawings without any creative efforts.

DETAILED DESCRIPTION

Figure 1:
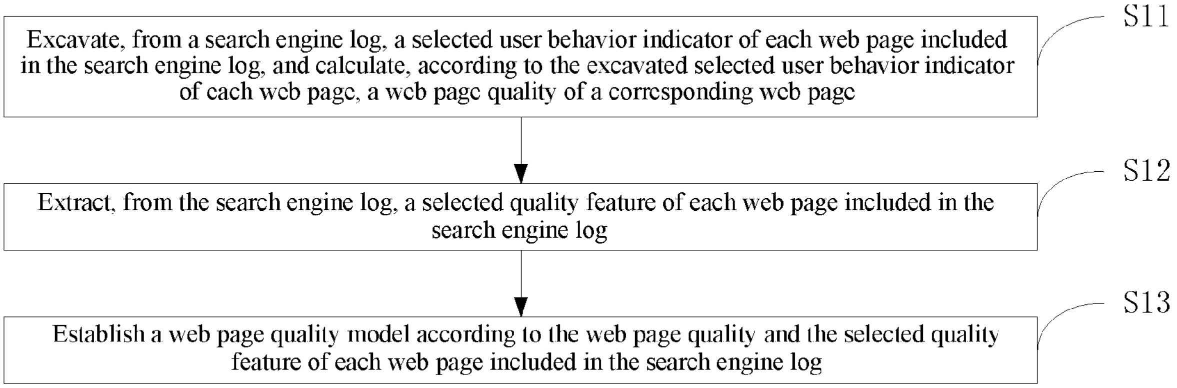
FIG. 1 is a schematic flowchart of a web page quality model establishment method according to an embodiment of the present invention.

For a problem in the prior art that accuracy of an established web page quality model is relatively poor, embodiments of the present invention provide a web page quality model establishment method. A procedure of the method is shown in FIG. 1. The method may be executed by a server, and the like. The server is used as an example for description below. Execution steps are as follows.

S11: Excavate, from a search engine log, a selected user behavior indicator of each web page included in the search engine log, and calculate, according to the excavated selected user behavior indicator of each web page, web page quality of a corresponding web page.

When a user needs to search for information, the user may enter a keyword in a search engine of a client. The server performs searching according to the keyword, sorts obtained web pages, and feeds back the sorted web pages to the search engine for the user to select from. The server records an interaction process between the search engine and the server, and stores the process in the search engine log. Therefore, a web page quality model may be established based on the search engine log.

First, a search engine log in a specified time period may be obtained. Then, web pages included in the search engine log are obtained. The specified time period may be the last 30 days, the last 45 days, the last 60 days, or the like, or may be set according to an actual need.

Then, the selected user behavior indicator of each web page included in the search engine log is excavated from the search engine log. The selected user behavior indicator includes at least one of a total click rate, a long click rate, a final click rate, or a navigation click rate, or a combination thereof The total click rate is a quantity of times a web page is clicked, for example, a quantity of times a web page is clicked that is recorded in a search engine log in the last 60 days.

The long click rate is a quantity of times a dwell time on a web page exceeds first specified duration after the web page is clicked. The first specified duration may be 30 seconds, 40 seconds, 50 seconds, or the like, or may be set according to an actual need. For example, the first specified duration may be a quantity of times a dwell time on a web page exceeds 40 seconds after the web page is clicked that is recorded in a search engine log in the last 60 days.

The final click rate is a quantity of times a web page is the last web page clicked in search results, for example, a quantity of times a web page is the last web page clicked in search results fed back by the server to the search engine that is recorded in a search engine log in the last 60 days.

The navigation click rate is a quantity of times a web page is the only web page clicked in search results, for example, a quantity of times a web page is the only web page clicked in search results fed back by the server to the search engine that is recorded in a search engine log in the last 60 days.

Finally, the web page quality of the corresponding web page is calculated according to the excavated selected user behavior indicator of each web page. In this way, the web page quality of a web page in the search engine may be obtained.

S12: Extract, from the search engine log, a selected quality feature of each web page included in the search engine log.

The selected quality feature includes at least one of a user behavior dimension feature, a web page dimension feature, or a third-party evaluation feature, or a combination thereof.

The user behavior dimension feature refers to determining the web page quality from a user perspective, and may specifically be a total click rate, a final click rate, an average click position, or the like of a web page. The user behavior dimension feature may be extracted from the search engine log.

The web page dimension feature refers to determining the web page quality according to web page content only, and specifically refers to whether a title and content of a web page are coherent and clear, and whether there is a cheating behavior such as piling up keywords, for example, a quantity of answers on a question & answer web page, a quantity of being liked by users, or whether there is a best answer. The web page dimension feature may be directly extracted by analyzing the content of the web page.

The third-party evaluation feature refers to determining the web page quality from a third party perspective, and specifically refers to whether there is a third party giving a link to the web page, access traffic of the web page, or the like. The third party may be another web page. The third-party evaluation feature needs to be obtained by means of link analysis or in a cooperation manner with the third party.

S13: Establish a web page quality model according to the web page quality and the selected quality feature of each web page included in the search engine log.

The web page quality model may be constructed according to the web page quality calculated in S11 and the selected quality feature of each web page extracted in S12 and by using a gradient boosting decision tree (GBDT) algorithm. An algorithm used may not be limited to the GBDT algorithm.

In this solution, a web page quality model is automatically established based on a large amount of search engine logs. Compared with a manual summarizing manner in the prior art, accuracy of the established web page quality model is relatively high, and accuracy of calculated web page quality is relatively high, thereby ensuring accuracy of a web page sorting result and user experience.

Specifically, the calculating, according to the excavated selected user behavior indicator of each web page, web page quality of a corresponding web page in the foregoing S11 specifically includes:

calculating, for each web page, a user behavior ratio of a current web page according to a total click rate, a long click rate, a final click rate, and a navigation click rate of the current web page; and determining, for each web page, the web page quality corresponding to the user behavior ratio of the current web page according to a correspondence between a range of the user behavior ratio and the web page quality.

When the user behavior ratio of the current web page is calculated according to the total click rate, the long click rate, the final click rate, and the navigation click rate of the current web page, a sum of the final click rate, the navigation click rate, and the long click rate of the current web page may be first calculated, to obtain a first sum value. A sum of the total click rate of the current web page and a first experience value is calculated, to obtain a second sum value. A ratio of the first sum value to the second sum value is calculated, and the ratio is determined as the user behavior ratio of the current web page. Specifically, the user behavior ratio may be calculated by using the following formula: the user behavior ratio=(the final click rate+the navigation click rate+the long click rate)/(the total click rate+the first experience value), where the first experience value is a value obtained according to actual experience, and is preferably 20.

A correspondence between a range of a user behavior ratio and the web page quality may be pre-established. The web page quality corresponding to a range of each user behavior ratio is stored in the correspondence. When a user behavior ratio of a web page is obtained, the web page quality of the web page may be determined from the correspondence. The correspondence between the range of the user behavior ratio and the web page quality is described below by using an example, and is shown in the following table:

TABLE 1

| Ranges of user behavior ratios | Web page quality |
|---|---|
| (0, 0.1) | 0 |
| [0.1, 0.3) | 1 |
| [0.3, 0.5) | 2 |
| [0.5, 0.8) | 3 |
| [0.8, 1] | 4 |

In Table 1, the web page quality is 0, 1, 2, 3, and 4. Higher web page quality indicates better web page quality.

Optionally, the web page quality model establishment method further includes:

filtering, according to the web page quality and the selected user behavior indicator, web pages included in the search engine log.

Correspondingly, the establishing a web page quality model according to the web page quality and the selected quality feature of each web page included in the search engine log in the foregoing S13 may further include: establishing the web page quality model according to the web page quality and the selected quality features of the web pages that are obtained after filtering and that are included in the search engine log.

A web page having high relevance and high web page quality is required in establishment of the web page quality model. Some web pages included in the search engine log may not satisfy the requirement. In this case, the web pages included in the search engine log need to be filtered. The web pages obtained after filtering are web pages really needed in the establishment of the web page quality model.

According to some embodiments, a method for filtering web pages included in a search engine log according to web page quality and a selected user behavior indicator includes: obtaining a total click rate of each web page; deleting a web page whose total click rate is less than or equal to a first specified quantity of times; for web pages whose total click rates are greater than the first specified quantity of times and are less than or equal to a second specified quantity of times, reserving a web page having lowest web page quality, and deleting web pages except the reserved web page; and for web pages whose total click rates are greater than the second specified quantity of times, reserving a web page having highest web page quality, and deleting web pages except the reserved web page.

When a total click rate of a web page is excessively low, even if the web page quality is very high, a final web page sorting result is not very ideal. Therefore, this type of web pages need to be filtered out from the web pages included in the search engine log. An example in which the selected user behavior indicator is a total click rate of a web page is used as an example for description below. A web page whose total click rate is less than or equal to 4 is directly deleted. For web pages whose total click rates are greater than 4 and are less than or equal to 10, only a web page whose web page quality is 0 is reserved, and web pages of other web page quality are deleted. The first specified quantity of times and the second specified quantity of times may be set according to an actual need. In this example, the first specified quantity of times is 4, and the second specified quantity of times is 10.

In an actual application, a search engine log in the last 60 days is excavated, and 24 million web pages and corresponding web page quality are obtained after filtering performed by using the foregoing rule.

The web page quality model establishment method is described above. After the web page quality model is established, an existing web page sorting model may be corrected by using the model, to obtain a new web page sorting model. Specific execution steps are as follows:

substituting a selected quality feature of a selected web page in a web page whole set into the web page quality model, to obtain the web page quality of the selected web page;

calculating a text score of the selected web page;

calculating a composite score of the selected web page according to the web page quality and the text score of the selected web page; and correcting an existing web page sorting model according to the composite score and the web page quality of the selected web page, to obtain a new web page sorting model.

The web page whole set stores all current web pages, all or some web pages in the web page whole set may be selected to correct the web page sorting model. One web page may be selected each time to correct the web page sorting model. The new web page sorting model is obtained after multiple times of correction. A web page selected each time is the selected web page. After the new web page sorting model is obtained, search results are sorted by using the new web page sorting model. The selected quality feature is already described in S12, and details are not described herein again.

The selected quality feature of the selected web page may be substituted into the web page quality model established in S13, to obtain the web page quality of the selected web page. It should be noted that if the selected web page has not been accessed yet, the selected web page does not have any web page dimension feature, and only includes a user behavior dimension feature and a third-party dimension feature, but this does not affect calculation of the web page quality of the selected web page.

A web page is generally associated with a search request. Therefore, a search request corresponding to the selected web page may be obtained. A matching degree between text content of the selected web page and the search request corresponding to the selected web page is calculated. The matching degree is determined as the text score of the selected web page. A matching degree calculation method may be implemented by using a method in the prior art, and details are not described herein.

The existing web page sorting model is generally obtained through training by using a GBrank algorithm. The new web page sorting model may also be corrected by using the GBrank algorithm. Compared with the existing web page sorting model, two features are added to the new web page sorting model, that is, a composite score of a web page and the web page quality of the web page. The composite score and the web page quality of the web page are considered together. Therefore, accuracy of the web page sorting model may be improved when the search results are sorted by using the new web page sorting model. A web page having a high composite score and high web page quality ranks on the top, so as to facilitate a user selection, and improve user experience.

Specifically, when the composite score of the selected web page is calculated according to the web page quality and the text score of the selected web page, the web page quality of the selected web page may be normalized. An escape penalty score of the selected web page is calculated according to the text score of the selected web page. The escape penalty score of the selected web page is multiplied by the text score, then a product is added to a specified floating point number, and an obtained sum value is multiplied by the normalized web page quality of the selected web page, to obtain the composite score of the selected web page.

When the web page quality of the selected web page is normalized, the following formula may be used: the normalized web page quality of the selected web page=(the web page quality of the selected web page—the web page quality corresponding to a web page having lowest web page quality in the web page whole set)/(the web page quality corresponding to a web page having highest web page quality in the web page whole set—the web page quality corresponding to the web page having the lowest web page quality in the web page whole set).

When the composite score of the selected web page is calculated, the following formula may be used: the composite score of the selected web page=the normalized web page quality of the selected web page (the text score of the selected web page*the escape penalty score of the selected web page+the specified floating point number), where the specified floating point number is preferably 0.01 f.

Specifically, when the escape penalty score of the selected web page is calculated according to the text score of the selected web page, it may be first determined whether the text score of the selected web page is greater than a first specified value. If the text score of the selected web page is greater than or equal to the first specified value, it is determined that the escape penalty score of the selected web page is equal to a second specified value. If the text score of the selected web page is less than the first specified value, it is determined that the escape penalty score of the selected web page is equal to a ratio of the text score of the selected web page to the first specified value.

The first specified value and the second specified value may be set according to an actual need. An example in which the first specified value is 130, and the second specified value is 1 is used for description. If the text score of the selected web page is greater than or equal to 130, the escape penalty score is equal to 1. Otherwise, the escape penalty score is equal to the text score of the selected web page divided by 130.

Based on the embodiment of the foregoing web page quality model establishment method, an embodiment of the present invention further provides a web page quality evaluation method, including:

substituting a selected quality feature of a selected web page in a web page whole set into the web page quality model established according to the foregoing method, to obtain the web page quality of the selected web page;

calculating a text score of the selected web page;

calculating a composite score of the selected web page according to the web page quality and the text score of the selected web page; and evaluating the web page quality according to a value of the composite score of the selected web page.

Preferably, the calculating a text score of the selected web page includes:

obtaining a search request corresponding to the selected web page;

calculating a matching degree between text content of the selected web page and the search request corresponding to the selected web page; and determining the matching degree as the text score of the selected web page.

Preferably, the calculating a composite score of the selected web page according to the web page quality and the text score of the selected web page includes:

normalizing the web page quality of the selected web page;

calculating an escape penalty score of the selected web page according to the text score of the selected web page; and multiplying the escape penalty score of the selected page by the text score of the selected web page, adding a product to a specified floating point number, and multiplying an obtained sum value by the normalized web page quality of the selected web page, to obtain the composite score of the selected web page.

Preferably, the calculating an escape penalty score of the selected web page according to the text score of the selected web page includes:

determining whether the text score of the selected web page is greater than a first specified value; and if the text score of the selected web page is greater than or equal to the first specified value, determining that the escape penalty score of the selected web page is equal to a second specified value; or if the text score of the selected web page is less than the first specified value, determining that the escape penalty score of the selected web page is equal to a ratio of the text score of the selected web page to the first specified value.

Preferably, a method for normalizing the web page quality of the selected web page includes: the normalized web page quality of the selected web page=(the web page quality of the selected web page—the web page quality corresponding to a web page having lowest web page quality in the web page whole set)/(the web page quality corresponding to a web page having highest web page quality in the web page whole set—the web page quality corresponding to the web page having the lowest web page quality in the web page whole set).

Preferably, the selected quality feature includes at least one of a user behavior dimension feature, a web page dimension feature, or a third-party evaluation feature, or a combination thereof Preferably, the method further includes: correcting an existing web page sorting model according to the composite score and the web page quality of the selected web page, to obtain a new web page sorting model for sorting search results.

The web page quality model establishment method and the web page quality evaluation method are described above. Compared with a method for manually summarizing a web page quality model and a method for manually evaluating web page quality in the prior art, the methods have the following advantages:

1. In the prior art, samples referred to when manual rules are summarized are limited. Consequently, the manual rules are incomplete and have poor generalization. In some embodiments of the present disclosure, establishment of a web page quality model is based on web pages included in a search engine log, and each web page may serve as a sample. In the exemplary methods according to some embodiments, millions of samples are used, which are far more than hundreds or thousands of samples referred to when the manual rules are summarized. The samples are more complete and have a good generalization.

2. Only a small amount of manual rules can be summarized due to complexity of problems and limitations of human abilities. An incorrect rule may be summarized, or some key rules may be left out. According to some exemplary embodiments of the present disclosure, a machine-learning method may be used. Thousands of selected quality features may be extracted by using an error minimization principle. Each selected quality feature may serve as a rule. In this way, thousands of rule trees may be generated. Therefore, it may be ensured that an error of a web page quality model obtained based on the existing millions of samples is minimized, and an incorrect rule is avoided to the largest extent, thereby greatly reducing a risk of leaving out a key rule.

3. In a manual rule, a rule maker's criterion may be different from a criterion used by a user to determine the web page quality. Consequently, user experience is affected. According to some exemplary embodiments of the present disclosure, a web page quality model is established by excavating a selected user behavior indicator. The web page quality is determined by using the user's criterion, thereby ensuring that the criterion of the web page quality and the user's criterion are as same as possible, and resolving a problem that criteria of the two are not the same.

4. If web page quality is added to a web page sorting model alone, a sorting effect of a web page sorting model is weakened. According to some exemplary embodiments of the present disclosure, the web page quality and a text score of a web page are fitted to a composite score of the web page. Then, the existing web page sorting model is corrected according to the composite score and the web page quality of the web page. The web page quality and the composite score are considered, and only a web page having good relevance and high quality has a high composite score. Therefore, after the feature of the composite score is used in the web page sorting model, a sorting effect of an upper-layer sorting model of the web page may be improved.

Figure 2:
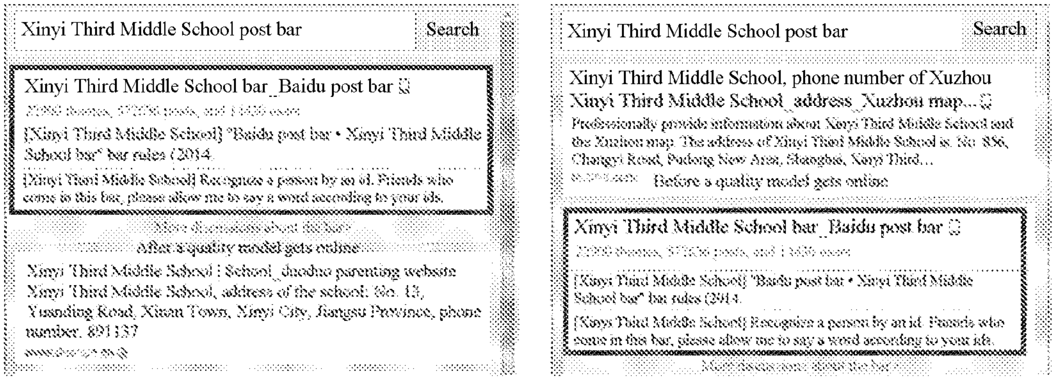
FIG. 2 is a schematic diagram of a comparison between search results obtained during web page searches performed by using an existing web page sorting model and a new web page sorting model according to an embodiment of the present invention.

As can be seen by combining the foregoing four points, in the exemplary embodiments of the present disclosure, sorting of web pages can be effectively improved, a probability that a dead link, a web page that has low quality, and a web page that has a cheating behavior are displayed to a user is reduced, and a probability that a web page having high quality is displayed to a user is improved. Search results obtained during web page searches performed by using an existing web page sorting model and a new web page sorting model are compared by using an instance. As shown in FIG. 2, keywords are "Xinyi Third Middle School post bar". The search result on the left is obtained by using the new web page sorting model, and the search result on the right is obtained by using the existing web page sorting model. The web page in the box is the best result. As can be seen from FIG. 2, when web pages are sorted by using the new web page sorting model, the best result is moved up from second to first, and a sorting position of the best result is improved. A user finds the best result from the sorted results more easily by using the new web page sorting model, thereby improving user experience.

Figure 3:
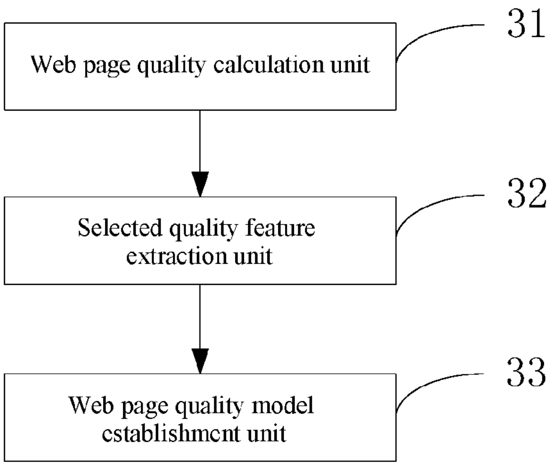
FIG. 3 is a schematic flowchart of a web page quality model establishment apparatus according to an embodiment of the present invention.

Based on a same inventive concept, an embodiment of the present invention provides a web page quality model establishment apparatus. The apparatus may be disposed in a server. A structure is shown in FIG. 3, including: a web page quality calculation unit 31, a selected quality feature extraction unit 32, and a web page quality model establishment unit 33.

The web page quality calculation unit 31 is configured to: excavate, from a search engine log, a selected user behavior indicator of each web page included in the search engine log, and calculate, according to the excavated selected user behavior indicator of each web page, the web page quality of a corresponding web page.

The selected quality feature extraction unit 32 is configured to extract, from the search engine log, a selected quality feature of each web page included in the search engine log.

The web page quality model establishment unit 33 is configured to establish a web page quality model according to the web page quality and the selected quality feature of each web page included in the search engine log.

In this solution, a web page quality model is automatically established based on a large amount of search engine logs. Compared with a manual summarizing manner in the prior art, accuracy of the established web page quality model is relatively high, and accuracy of calculated web page quality is relatively high, thereby ensuring accuracy of a web page sorting result and user experience.

Specifically, the selected user behavior indicator includes at least one of a total click rate, a long click rate, a final click rate, or a navigation click rate, or a combination thereof.

The total click rate is a quantity of times a web page is clicked, the long click rate is a quantity of times a dwell time on a web page exceeds a first specified duration after the web page is clicked, the final click rate is a quantity of times a web page is the last web page clicked in search results, and the navigation click rate is a quantity of times a web page is the only web page clicked in search results.

Specifically, the web page quality calculation unit 31 includes a user behavior ratio calculation subunit and a web page quality determining subunit.

The user behavior ratio calculation subunit is configured to calculate a user behavior ratio of a current web page according to a total click rate, a long click rate, a final click rate, and a navigation click rate of the current web page.

The web page quality determining subunit is configured to determine the web page quality corresponding to the user behavior ratio of the current web page according to a correspondence between a range of the user behavior ratio and the web page quality.

The user behavior ratio calculation subunit includes: a first sum value calculation subunit, a second sum value calculation subunit, and a user behavior ratio determining subunit.

The first sum value calculation subunit is configured to calculate a sum of the final click rate, the navigation click rate, and the long click rate of the current web page, to obtain a first sum value.

The second sum value calculation subunit is configured to calculate a sum of the total click rate of the current web page and a first experience value, to obtain a second sum value.

The user behavior ratio determining subunit is configured to: calculate a ratio of the first sum value to the second sum value, and determine the ratio as the user behavior ratio of the current web page.

Optionally, the web page quality model establishment apparatus further includes a web page filtering unit, configured to:

filter, according to the web page quality and the selected user behavior indicator, web pages included in the search engine log.

In this case, the web page quality model establishment unit is configured to establish the web page quality model according to the web page quality and the selected quality features of the web pages that are obtained after filtering and that are included in the search engine log.

The web page filtering unit includes a total click rate obtaining subunit and a web page filtering subunit.

The total click rate obtaining subunit is configured to obtain a total click rate of each web page included in the search engine log.

The web page filtering subunit is configured to: delete a web page whose total click rate is less than or equal to a first specified quantity of times; for web pages whose total click rates are greater than the first specified quantity of times and are less than or equal to a second specified quantity of times, reserve a web page having lowest web page quality, and delete web pages except the reserved web page; and for web pages whose total click rates are greater than the second specified quantity of times, reserve a web page having highest web page quality, and delete web pages except the reserved web page.

Specifically, the selected quality feature includes at least one of a user behavior dimension feature, a web page dimension feature, or a third-party evaluation feature, or a combination thereof Optionally, the web page quality model establishment apparatus further includes:

a selected quality feature substitution unit, a text score calculation unit, a composite score calculation unit, and a web page sorting model correction unit.

The selected quality feature substitution unit is configured to substitute a selected quality feature of a selected web page in a web page whole set into the web page quality model, to obtain the web page quality of the selected web page.

The text score calculation unit is configured to calculate a text score of the selected web page.

The composite score calculation unit is configured to calculate a composite score of the selected web page according to the web page quality and the text score of the selected web page.

The web page sorting model correction unit is configured to correct an existing web page sorting model according to the composite score and the web page quality of the selected web page, to obtain a new web page sorting model.

The text score calculation unit includes: a search request obtaining subunit, a matching degree calculation subunit, and a text score determining subunit.

The search request obtaining subunit is configured to obtain a search request corresponding to the selected web page.

The matching degree calculation subunit is configured to calculate a matching degree between text content of the selected web page and the search request corresponding to the selected web page.

The text score determining subunit is configured to determine the matching degree as the text score of the selected web page.

The composite score calculation unit includes: a normalization subunit, an escape penalty score calculation subunit, and a composite score calculation subunit.

The normalization subunit is configured to normalize the web page quality of the selected web page.

The escape penalty score calculation subunit is configured to calculate an escape penalty score of the selected web page according to the text score of the selected web page.

The composite score calculation subunit is configured to: multiply the escape penalty score of the selected page by the text score of the selected web page, add a product to a specified floating point number, and multiply an obtained sum value by the normalized web page quality of the selected web page, to obtain the composite score of the selected web page.

The escape penalty score calculation subunit includes a text score judging subunit and an escape penalty score determining subunit.

The text score judging subunit is configured to determine whether the text score of the selected web page is greater than a first specified value.

The escape penalty score determining subunit is configured to: if the text score of the selected web page is greater than or equal to the first specified value, determine that the escape penalty score of the selected web page is equal to a second specified value; or if the text score of the selected web page is less than the first specified value, determine that the escape penalty score of the selected web page is equal to a ratio of the text score of the selected web page to the first specified value.

Based on the foregoing embodiment of the web page quality model establishment apparatus, an embodiment of the present invention further provides a web page quality evaluation apparatus, including: the foregoing web page quality model establishment apparatus, a selected quality feature substitution unit, a text score calculation unit, a the composite score calculation unit, and an evaluation unit.

The selected quality feature substitution unit is configured to substitute a selected quality feature of a selected web page in a web page whole set into the web page quality model, to obtain the web page quality of the selected web page.

The text score calculation unit is configured to calculate a text score of the selected web page.

The composite score calculation unit is configured to calculate a composite score of the selected web page according to the web page quality and the text score of the selected web page.

The evaluation unit is configured to evaluate the web page quality according to a value of the composite score of the selected web page.

Preferably, the text score calculation unit specifically includes: a search request obtaining subunit, a matching degree calculation subunit, and a text score determining subunit.

The search request obtaining subunit is configured to obtain a search request corresponding to the selected web page.

The matching degree calculation subunit is configured to calculate a matching degree between text content of the selected web page and the search request corresponding to the selected web page.

The text score determining subunit is configured to determine the matching degree as the text score of the selected web page.

Preferably, the composite score calculation unit specifically includes: a normalization subunit, an escape penalty score calculation subunit, and a composite score calculation subunit.

The normalization subunit is configured to normalize the web page quality of the selected web page.

The escape penalty score calculation subunit is configured to calculate an escape penalty score of the selected web page according to the text score of the selected web page.

The composite score calculation subunit is configured to: multiply the escape penalty score of the selected page by the text score of the selected web page, add a product to a specified floating point number, and multiply an obtained sum value by the normalized web page quality of the selected web page, to obtain the composite score of the selected web page.

Preferably, the escape penalty score calculation subunit specifically includes a text score judging subunit and an escape penalty score determining subunit.

The text score judging subunit is configured to determine whether the text score of the selected web page is greater than a first specified value.

The escape penalty score determining subunit is configured to: if the text score of the selected web page is greater than or equal to the first specified value, determine that the escape penalty score of the selected web page is equal to a second specified value; or if the text score of the selected web page is less than the first specified value, determine that the escape penalty score of the selected web page is equal to a ratio of the text score of the selected web page to the first specified value.

Preferably, the selected quality feature includes at least one of a user behavior dimension feature, a web page dimension feature, or a third-party evaluation feature, or a combination thereof Preferably, the apparatus further includes: a web page sorting model correction unit, configured to correct an existing web page sorting model according to the composite score and the web page quality of the selected web page, to obtain a new web page sorting model.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In other words, moreover, the present application further discloses a terminal device, including: a memory, configured to store a computer program instruction used to execute the method shown in FIG. 1; and a processor, coupled to the memory, where the processor is configured to execute the computer program instruction stored in the memory.

In addition, the method according to the present disclosure may further be implemented as a computer program executed by a processor (such as a CPU) in a mobile terminal, and is stored in a memory of the mobile terminal. When the computer program is executed by the processor, the processor executes the foregoing functions defined in the method of the present disclosure.

In addition, the method according to the present application may further be implemented as a computer program product. The computer program product includes a computer-readable medium. The computer-readable medium stores a computer program configured to execute the foregoing functions defined in the method of the present disclosure.

A person skilled in art may also understand that, various exemplary logic blocks, modules, circuits, and algorithm steps described with reference to the present disclosure may also be implemented as electronic hardware, computer software, or a combination of the two. To clearly describe the interchangeability between hardware and software, functions of various exemplary components, blocks, modules, circuits, and steps are already generally described. Whether the function is implemented as software or hardware depends on specific application, and design constraint imposed on the entire system. A person skilled in the art may implement the function in various manners for each specific application, but this implementation shall not be construed as going beyond the scope of the present disclosure.

Although some optional embodiments of the present invention have been described, a person skilled in the art can make changes and modifications to these embodiments once they learn the basic inventive concept. Therefore, the following claims are intended to be construed as to cover the optional embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A web page quality model establishment method, comprising:

excavating, from a search engine log, selected user behavior indicators of each of respective web pages in the search engine log;

calculating, according to the excavated selected user behavior indicators of each of the respective web pages, web page qualities of each of the respective web pages;

filtering, according to the web page qualities and the selected user behavior indicators, the respective web pages;

extracting, from the search engine log, selected quality features of each of the respective filtered web pages; and establishing a web page quality model according to:
the web page qualities; and
the selected quality features of each of the respective filtered web pages.

2. The method according to claim 1, wherein each of the selected user behavior indicators corresponding to a web page of the respective web pages comprise at least one of:
a total click rate,
a long click rate,
a final click rate, or
a navigation click rate, or
a combination thereof, wherein:
the total click rate is a quantity of times that the web page is clicked,
the long click rate is a quantity of times that a dwell time on the web page exceeds a first specified duration after the web page is clicked,
the final click rate is a quantity of times in which the web page was clicked latest compared to other web pages in search results, and
the navigation click rate is a quantity of times in which no other web page was clicked in the search results.

3. The method according to claim 2, wherein the calculating, according to the excavated selected user behavior indicators of each of the respective web pages, the web page qualities of each of the respective web pages, comprises:
calculating, for the web page, a user behavior ratio according to the total click rate, the long click rate, the final click rate, and the navigation click rate; and
determining the web page qualities of each of the respective web pages corresponding to the user behavior ratio of the web page according to a correspondence between a range of the user behavior ratio and the web page qualities of each of the respective web pages.

4. The method according to claim 3, wherein the calculating the user behavior ratio comprises:
calculating a sum of the final click rate, the navigation click rate, and the long click rate of the web page, to obtain a first sum value;
calculating a sum of the total click rate of the web page and a first experience value, to obtain a second sum value; and
calculating a ratio of the first sum value to the second sum value, and determining the ratio as the user behavior ratio.

5. The method according to claim 1, wherein the filtering, according to the web page qualities and the selected user behavior indicators, the respective web pages comprises:
obtaining a total click rate of each of the respective web pages;
deleting a web page in which the total click rate is less than or equal to a first specified quantity;
for web pages in which respective total click rates are greater than the first specified quantity and less than or equal to a second specified quantity, reserving a web page having a lowest web page quality, and deleting web pages except the reserved web page; and
for web pages in which the respective total click rates are greater than the second specified quantity, reserving a web page having a highest web page quality, and deleting web pages except the reserved web page.

6. The method according to claim 1, wherein the selected quality features comprise at least one of a user behavior dimension feature, a web page dimension feature, or a third-party evaluation feature, or a combination thereof.

7. A web page quality evaluation method, comprising:
substituting a selected quality feature of a selected web page into a web page quality model, to obtain a web page quality of the selected web page, wherein the web page quality model is established according to web page qualities and selected quality features of each of the respective web pages, the selected quality features being extracted from a search engine log, and the web page qualities being calculated according to excavated selected user behavior indicators from the search engine log;
calculating a text score of the selected web page;
calculating a composite score of the selected web page according to the web page quality and the text score of the selected web page; and
evaluating the web page quality according to a value of the composite score of the selected web page.

8. The method according to claim 7, wherein the calculating a text score of the selected web page comprises:
obtaining a search request corresponding to the selected web page;
calculating a matching degree between text content of the selected web page and the search request corresponding to the selected web page; and
determining the matching degree as the text score of the selected web page.

9. The method according to claim 7, wherein the calculating a composite score of the selected web page according to the web page quality and the text score of the selected web page comprises:
normalizing the web page quality of the selected web page;
calculating an escape penalty score of the selected web page according to the text score of the selected web page; and
multiplying the escape penalty score of the selected page by the text score of the selected web page, adding a product to a specified floating point number, and multiplying an obtained sum value by the normalized web page quality of the selected web page, to obtain the composite score of the selected web page.

10. The method according to claim 9, wherein the calculating an escape penalty score of the selected web page according to the text score of the selected web page comprises:
determining whether the text score of the selected web page is greater than a first specified value; and
if the text score of the selected web page is greater than or equal to the first specified value, determining that the escape penalty score of the selected web page is equal to a second specified value; or
if the text score of the selected web page is less than the first specified value, determining that the escape penalty score of the selected web page is equal to a ratio of the text score of the selected web page to the first specified value.

11. The method according to claim 9, wherein a method for normalizing the web page quality of the selected web page comprises:
the normalized web page quality of the selected web page=(the web page quality of the selected web page—the web page quality corresponding to a web page having lowest web page quality in the web page whole set)/(the web page quality corresponding to a web page having highest web page quality in the web page whole set—the web page quality corresponding to the web page having the lowest web page quality in the web page whole set).

12. The method according to claim 7, wherein the selected quality feature comprises at least one of a user behavior dimension feature, a web page dimension feature, or a third-party evaluation feature, or a combination thereof.

13. The method according to 7, further comprising:

correcting an existing web page sorting model according to the composite score and the web page quality of the selected web page, to obtain a new web page sorting model for sorting search results.

14. A web page quality model establishment apparatus, comprising:

one or more processors, configured to:

excavate, from a search engine log, selected user behavior indicators of each of respective web pages in the search engine log;

calculate, according to the excavated selected user behavior indicators of the respective web pages, web page qualities of each of the respective web pages;

filter, according to the web page qualities and the selected user behavior indicators, the respective web pages;

extract, from the search engine log, selected quality features of each of the respective web pages; and establish a web page quality model according to:

the web page qualities; and the selected quality features of each of the respective filtered web pages.

15. The apparatus according to claim 14, wherein each of the selected user behavior indicators corresponding to a web page of the respective web pages comprise at least one of:

a total click rate, a long click rate, a final click rate, or a navigation click rate, or a combination thereof, wherein:

the total click rate is a quantity of times that the web page is clicked, the long click rate is a quantity of times that a dwell time on the web page exceeds a first specified duration after the web page is clicked, the final click rate is a quantity of times in which the web page was clicked latest compared to other web pages in search results, and the navigation click rate is a quantity of times in which no other web page was clicked in the search results.

16. The apparatus according to claim 15, wherein the one or more processors are further configured to:

calculate for the web page, a user behavior ratio according to the total click rate, the long click rate, the final click rate, and the navigation click rate; and determine the web page qualities of each of the respective web pages corresponding to the user behavior ratio of the web page according to a correspondence between a range of the user behavior ratio and the web page qualities of each of the respective web pages.

17. The apparatus according to claim 16, wherein the one or more processors are further configured to:

calculate a sum of the final click rate, the navigation click rate, and the long click rate of the web page, to obtain a first sum value;

calculate a sum of the total click rate of the web page and a first experience value, to obtain a second sum value; and calculate a ratio of the first sum value to the second sum value, and determine the ratio as the user behavior ratio.

18. The apparatus according to claim 14, wherein the one or more processors are further configured to:

obtain a total click rate of each of the respective web pages;

delete a web page in which the total click rate is less than or equal to a first specified quantity;

for web pages in which respective total click rates are greater than the first specified quantity and less than or equal to a second specified quantity, reserve a web page having a lowest web page quality, and delete web pages except the reserved web page; and for web pages in which the respective total click rates are greater than the second specified quantity, reserve a web page having a highest web page quality, and delete web pages except the reserved web page.

* * * * *